United States Patent [19]

Banjo et al.

[11] Patent Number: 4,838,804
[45] Date of Patent: Jun. 13, 1989

[54] MECHANISM FOR CONNECTING IC CARD AND EXTERNAL DEVICE

[75] Inventors: Toshinobu Banjo; Tetsuya Ueda; Shigeo Onoda; Yasushi Kasatani, all of Itami, Japan

[73] Assignee: Mitsubishi Denki Kabushiki Kaisha, Japan

[21] Appl. No.: 173,149

[22] Filed: Mar. 25, 1988

[30] Foreign Application Priority Data

Mar. 27, 1987 [JP] Japan .................................. 62-75125
Mar. 27, 1987 [JP] Japan .................................. 62-75126
Mar. 31, 1987 [JP] Japan .................................. 62-79925

[51] Int. Cl.[4] .......................................... H01R 13/62
[52] U.S. Cl. .................................................... 439/325
[58] Field of Search ............... 439/325, 327, 328, 345, 439/348, 350, 840

[56] References Cited

U.S. PATENT DOCUMENTS 2,802,188 8/1957 Badders .............................. 439/325
3,343,852 9/1967 Blight et al. ......................... 439/348

FOREIGN PATENT DOCUMENTS 1200409 9/1965 Fed. Rep. of Germany ...... 439/328

Primary Examiner—Joseph H. McGlynn
Attorney, Agent, or Firm—Leydig, Voit & Mayer

[57] ABSTRACT

A connection mechanism for connecting an IC card and an external device to each other, having: a plurality of electrode terminals formed on the IC card package in which a semiconductor device is incorporated, the electrode terminals being adapted to connect the semiconductor device to the external device; a pair of engagement recesses formed on the package of the IC card; and a connector provided in the external device, the connector having a card receiving portion into which the IC card is inserted, a plurality of electrode-contacting pieces disposed inside the card receiving portion and capable of contacting the plurality of electrode terminals of the IC card when the IC card is inserted into the card receiving portion to a predetermined position, and a pair of retaining members disposed on the card receiving portion and capable of advancing toward or retreating from the engagement recesses of the IC card and resiliently engaging the engagement recesses so as to retain the IC card at the predetermined position when the IC card is inserted to the predetermined position.

12 Claims, 11 Drawing Sheets

MECHANISM FOR CONNECTING IC CARD AND EXTERNAL DEVICE

BACKGROUND OF THE INVENTION

This invention relates to a mechanism for connecting an IC card, such as a game-program card, to an external device, such as a card reader for reading information recorded in the IC card.

Figure 1:
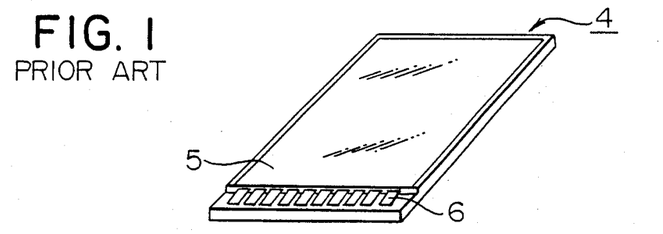
FIG. 1 is a perspective view of a conventional IC card.
Figure 2:
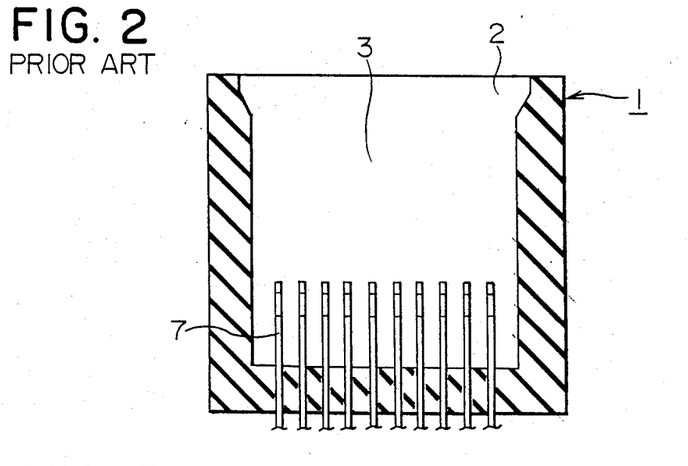
FIG. 2 is a plan view of a conventional connector in which an upper portion of the connector is omitted.
Figure 3:
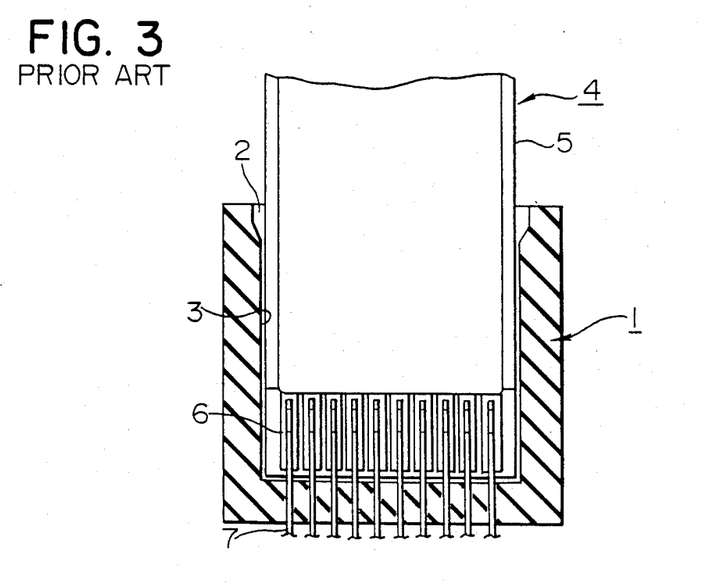
FIG. 3 is a plan view of the conventional IC card and connector in which the upper portion of the connector is omitted, illustrating a state in which the IC card is inserted into the connector.

FIG. 1 is a schematic perspective view of a conventional IC card 4, and FIG. 2 is a plan view showing the internal structure of a connector 1 provided in an external device (e.g., card reader), in which an upper portion of the connector is omitted. A card entrance 2 and a card receiving portion 3 are formed in the connector 1, and a multiplicity of elastic electrode-contacting pieces 7 are disposed on an inner portion of the card receiving portion 3. The IC card 4 incorporates a semiconductor device (not shown) which is encapsulated in a package 5. A multiplicity of electrode terminals 6 which are external terminals of the semiconductor device are disposed on an obverse-side surface of a front portion of the package 5 in relation to the direction in which the IC card 4 is inserted into the connector 1. FIG. 3 shows a state in which the conventional IC card 4 is inserted into the connector 1.

The IC card 4 is used by being inserted into the card receiving portion 3 of the connector 1 through the card entrance 2. When the IC card 4 is completely inserted into the connector 1, the electrode terminals 6 disposed on the surface of the IC card 4 contact the electrode-contacting pieces 7 disposed in the connector 1, thereby establishing electrical connection between the semiconductor device in the IC card 4 and the external device.

To disconnect the semiconductor device in the IC card 4 and the external device from each other, the IC card 4 is pulled out from the card receiving portion 3 of the connector 1.

The thus-constructed mechanism for connecting the conventional IC card and the external device to each other does not function to sufficiently retain the IC card 4 in the card receiving portion 3 of the connector 1. There is, therefore, a possibility of the contacts of the electrode terminals 6 and the electrode-contacting pieces 7 becoming misaligned while in contact with each other, or a possibility of the IC card 4 coming out of the connector after the card 4 has been inserted therein. In addition, the depth to which the IC card 4 is inserted into the connector 1 can not be perceived by the operator, and there is a possibility of the front end of the IC card 4 being broken by roughly impacting the surface of the innermost wall of the connector 1 if the card is carelessly inserted into the connector.

In the conventional connection mechanism, a card which is different from the specific IC card 4 can be inserted if it has the same outside dimensions of the package 5. Therefore, it cannot be confirmed whether or not a card is acceptable until the external device is actually started after the IC card 4 has been inserted into the card receiving portion 3 of the connector 1.

SUMMARY OF THE INVENTION

The present invention has been achieved in consideration of these circumstances, and an object of the present invention is to provide a mechanism for connecting an IC card and an external device to each other and which is capable of preventing detachment of the IC card, misalignment of the electrode terminals of the IC card with the electrode-contacting pieces of a connector provided in the external device, and damage to the IC card when the IC card is inserted into the connector.

Another object of the present invention is provide a mechanism between an IC card and an external device which is capable of detecting the conformity of the IC card to a connector provided in the external device when the IC card is inserted in the connected, the external device being capable of starting an operation thereof when the IC card is determined to be one of the cards acceptable for use according to the result of above conformity detection.

The present invention provides in one of its aspects a connection mechanism constituted by engagement recesses formed in side surfaces of the IC card and retaining means disposed in two minor inner walls of a connector provided in an external device, the retaining means being capable of engaging with and disengaging from the engagement recesses by advancing toward or retreating from the engagement recesses when the card is inserted into the connector.

The present invention provides in another of its aspects a connection mechanism constituted by engagement recesses formed in side surfaces of the IC card and contact means for determining whether the IC card is an acceptable card or not. The contact means are disposed in two minor inner walls of a connector provided in an external device face and engage the engagement recesses when the predetermined IC card which is acceptable for use with the external device is inserted into the connector. That is, the IC cards which are acceptable for use in the external device have the engagement recess in the side surfaces thereof in the portion facing and engaging the contact means of the connector. This contact means may have the above function of positively retaining the IC card in the connector at a desired position by engaging with the engagement recesses of the IC card.

In accordance with the present invention, the IC card can be positively retained at a predetermined position in the connector, and the engagement between the engagement recesses of the IC card and the retaining means of the connector can be perceived as a distinctive click.

In accordance with the present invention, the contact means which are provided in the connector for determining whether the IC card inserted in the connector is one of the cards acceptable for use or not, are in the open state or closed state when the IC card is inserted into the connector of the external device, thereby starting or preventing the operaton of driving the external device in response to the state of the contact means.

DESCRIPTION OF THE PREFERRED EMBODIMENT

Figure 4:
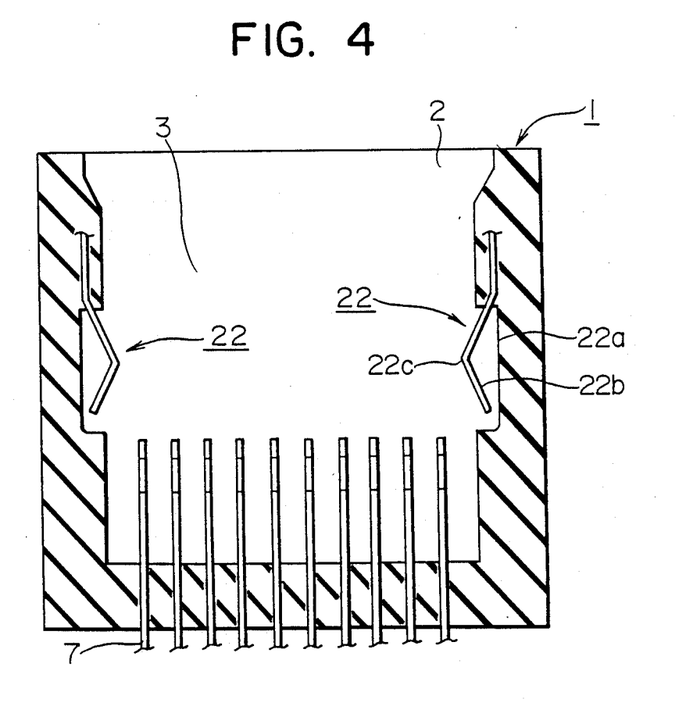
FIG. 4 is a sectional plan view of a connector for connecting an IC card and an external device to each other according to a first embodiment of the present invention.
Figure 5:
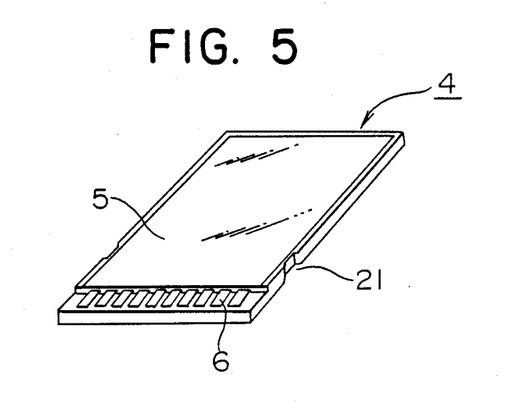
FIG. 5 is a perspective view of an IC card in accordance with the first embodiment.
Figure 6:
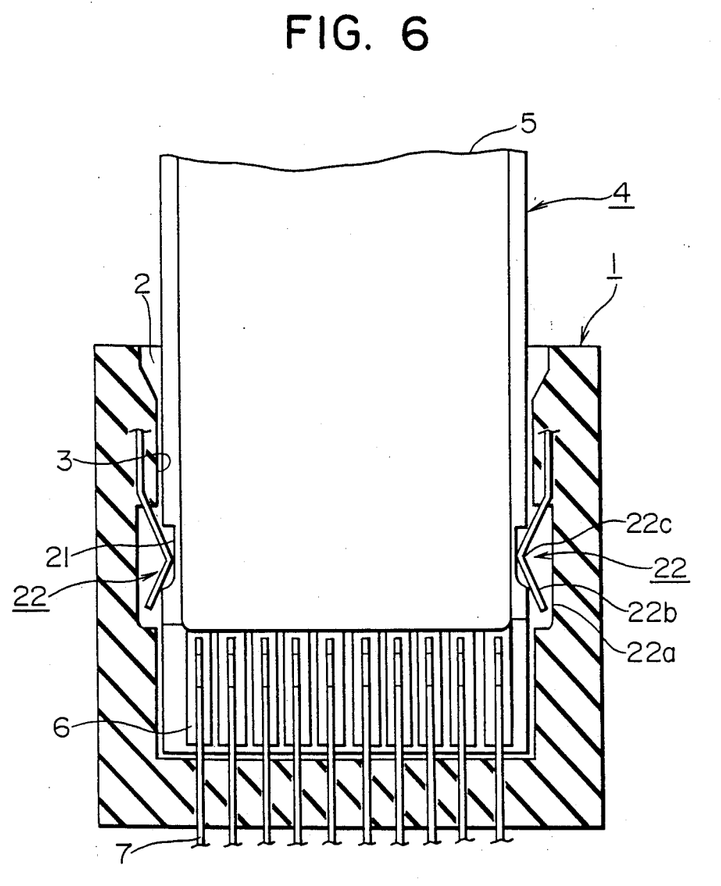
FIG. 6 is a plan view of the IC card shown in FIG. 5 and of the connector shown in FIG. 4, illustrating a state in which the former is inserted into the latter.

FIGS. 4 and 5 show a connector and an IC card provided with a mechanism for connecting the IC card and an external device and which represents an embodiment of the present invention. FIG. 4 is a sectional plan view of the connector in which an upper frame member is omitted, and FIG. 5 is a perspective view of the IC card. FIG. 6 shows a state in which the IC card shown in FIG. 5 is inserted into the connector shown in FIG. 4. In these figures, components which are identical or correspond to those of the conventional arrangement shown in FIGS. 1 to 3 are indicated by the same reference characters, and they will not be described in detail again. As shown in FIG. 5, a pair of engagement recesses 21 is formed in side surfaces of the package 5 of the IC card 4. This pair of engagement recesses 21 is formed when the package 5 is formed. As shown in FIG. 4, one of a pair of members which constitute the retaining means 22 is disposed in each of the side walls of the connector 1. Each group of members of the retaining means is constituted by a recess 22a formed in each of the two side walls of the card receiving portion 3 of the connector 1, and a resilient piece 22b having a bent portion 22c projecting inside the card receiving portion 3. The resilient piece 22b is formed in such a manner that it can be elastically deflected toward the recess 22a and can be engaged with the engagement recess 21 of the card 4 when the card 4 is inserted into the card receiving portion 3 to a predetermined position. Generally, this position is determined to optimize the state of contact between the plurality of electrode terminals 6 of the IC card 4 and the plurality of electrode-contacting pieces 7 of the connector 1. The bent portions 22c of the pair of resilient pieces 22b are formed to enable the card 4 to be smoothly inserted.

The thus-constructed connection mechanism operates as described below. When the IC card 4 is inserted into the card receiving portion 3 of the connector 1 through the card entrance 2, the resilient pieces 22b are moved into the recesses 22a by the side surfaces of the IC card. Thereafter, as shown in FIG. 6, the resilient pieces 22b engage the engagement recesses 21 of the IC card 4 when the card 4 is inserted into the connector 1 and the electrode terminals 6 of the card 4 contact the electro-contacting pieces 7 of the connector 1. Thus, the IC card 4 can be positively retained at the predetermined position in the card receiving portion 3, thereby preventing the electrode terminals 6 and the electrode-contacting pieces 7 from being misaligned. In addition, the engagement between the engagement recesses 21 of the card 4 and the elastic pieces 22b of the connector 1 can be preceived as a click sound. It is thereby possible to prevent the IC card 4 from colliding against the connector 1 and, hence, to prevent the IC card 4 or the connector 1 from being broken when the IC card is inserted into the connector.

The IC card 4 is pulled out from the card receiving portion 3 of the connector 1 against the retaining force of the resilient pieces 22b.

Figure 7:
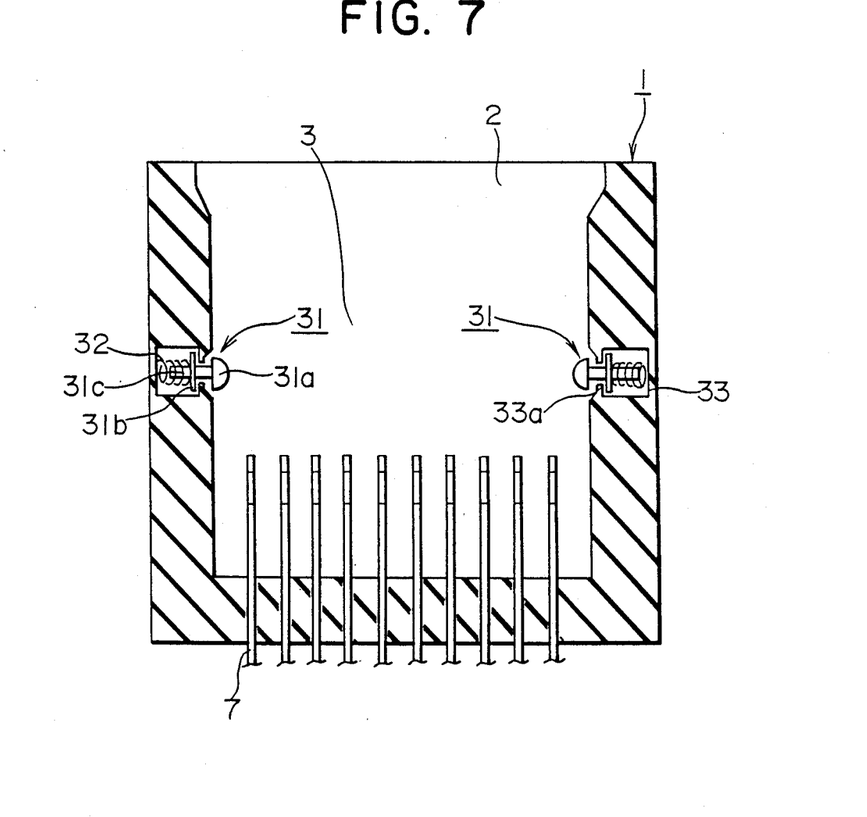
FIG. 7 is a sectional plan view of another example of the connector in accordance with the first embodiment.
Figure 8:
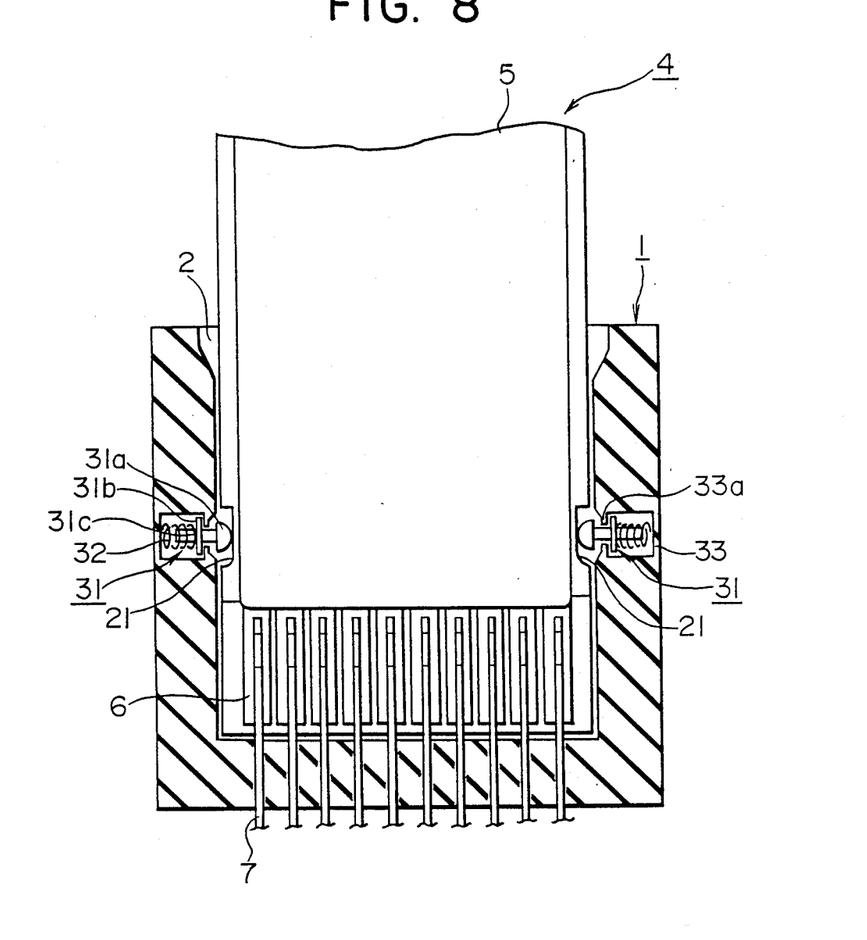
FIG. 8 is a sectional plan view of the IC card shown in FIG. 5 and of the connector shown in FIG. 7, illustrating a state in which the former is inserted into the latter.

The retaining means provided in the connector 1 are not limited to the type in accordance with the above-described embodiment, and other types of retaining means, including one shown in FIGS. 7 and 8, can be used instead. Referring to FIGS. 7 and 8, each retaining means 31 is constituted by: a recess 33 which is formed in a side wall of the card receiving portion 3 of the connector 1 and which has stop portions 33a provided on opposite sides of the recess; and a retaining pin 31c which is capable of projecting from or retreating into the recess 33 while being urged out by the recess by a spring 32, and which has a hemispheric engagement head 31a and a collar 31b for preventing it from coming out of the recesse. As shown in FIG. 8, the engagement heads 31a of the retaining pins 31c engage the engagement recesses 21 of the card 4 when the card 4 is inserted into the connector 1 and the electrode terminals 6 of the card 4 contact the electrode-contacting pieces 7 of the connector 1.

The engagement recesses 21 formed on the IC card and the retaining means 22 or 31 formed on the connector are not limited to those according to the above-described embodiments, and the position, shape, outside dimensions and number of these portions can be selected as desired.

Figure 9:
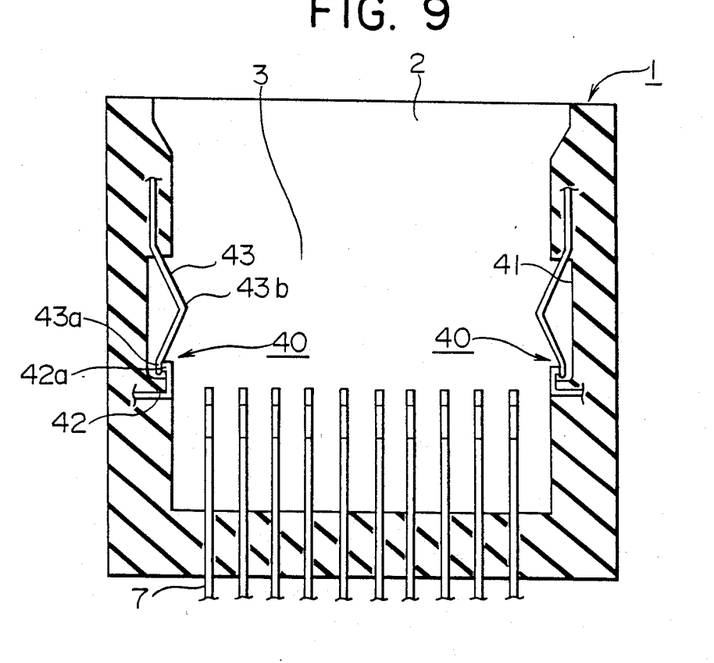
FIG. 9 is a sectional plan view of a connector in accordance with a second embodiment of the present invention.
Figure 10:
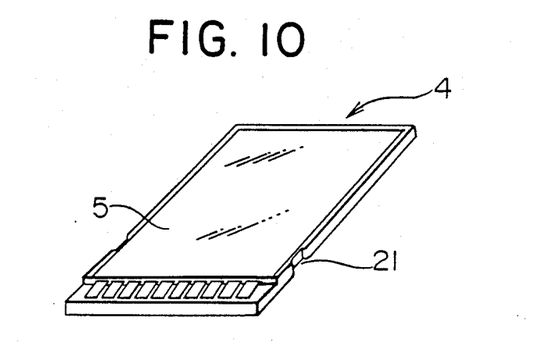
FIG. 10 is a perspective view of an IC card in accordance with the second embodiment.

FIGS. 9 and 10 show a connector and an IC card provided with a connection mechanism for connecting the IC card to an external device and which represents another embodiment of the present invention. FIG. 9 is a sectional plan view of the connector in which an upper frame portion is omitted, and FIG. 10 is a perspective view of the IC card. In these figures, components which are identical or correspond to those of the conventional arrangement shown in FIGS. 1 to 3 are indicated by the same reference characters, and they will not be described in detail again. As shown in FIG. 10, a pair of engagement recesses 21 are formed in side surfaces of the package 5 of the IC card 4. This pair of engagement recesses 21 are formed when the package 5 is formed. As shown in FIG. 9, one of a pair of members which constitute a contact means 40 are disposed in each of the side walls of the connector 1. Each group of members of the contact means 40 is constituted by a recess 41 formed in one of the side walls of the card receiving portion 3 of the connector 1, and first and second contact elements 41 and 43. The first contact element 42 is a hook-like member made of an electrically conductive material and has a contact point 42a formed at its one end. The other end of the hook-like member is fixed to a wall portion of the recess 41 and is electrically connected to, for example, a control section (not shown) of the external device. The second contact element 43 is made of an electrically conductive material and has a contact point 43a formed at its one end, and a bent portion 43b formed at its intermediate portion. The other end of the second contact element 43 is fixed to a wall portion of the recess 41 and is electrically connected to the control section of the external device. The bent portion 43b of the second contact element 43 projects inside the card receiving portion 3. The contact means 40 is formed in such a manner that, when the card 4 is inserted into the card receiving portion 3 to a predetermined position, the bent portion 43b of the contact element 43 enters the engagement recess 21 formed in the card 4 and the contact point 43a of the second contact element 43 contacts the contact point 42a of the first contact element 42. When the card reaches this predetermined position, the contact between the plurality of electrode terminals 6 of the IC card 4 and the electrode-contacting pieces 7 of the connector 1 becomes optimized. As to the first and second contact elements, at least the second contact element 43 is entirely formed from a material which is electrically conductive and which can be elastically deformed.

Figure 11:
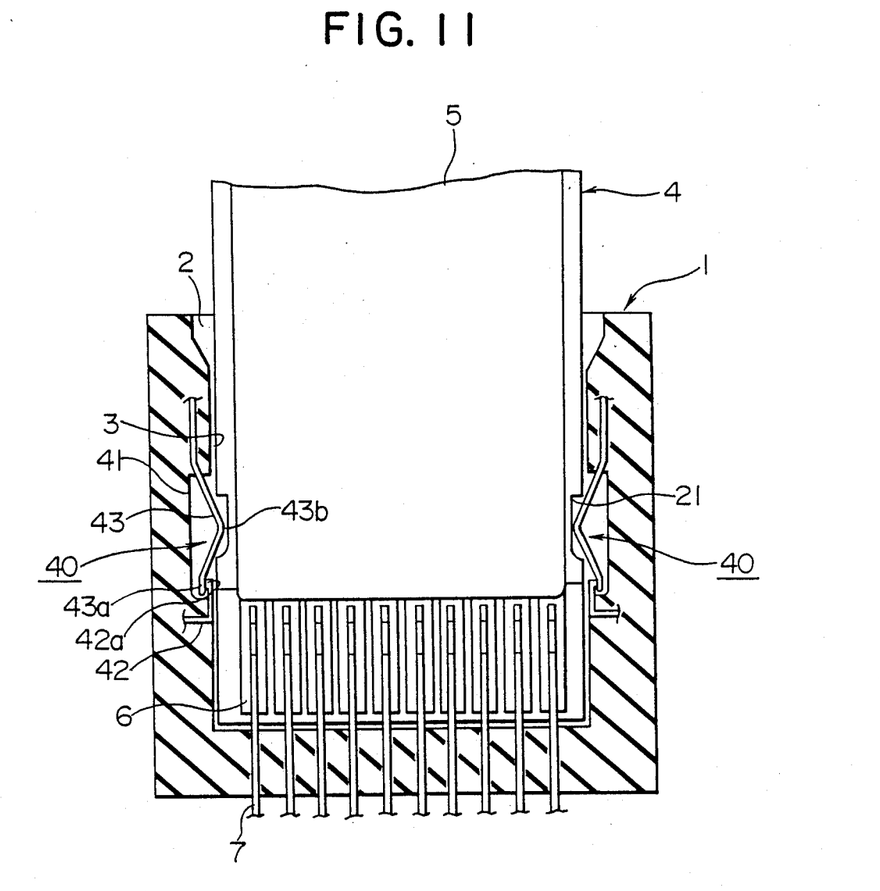
FIG. 11 is a sectional plan view of the IC card shown in FIG. 10 and of the connector shown in FIG. 9, illustrating a state in which the former is inserted into the latter.

In this connection mechanism, when the IC card 4 is inserted into the card receiving portion 3 of the connector 1 through the card entrance 2, and when the electrode terminals 6 of the card 4 reach the position at which they are brought into contact with the electrode-contacting pieces 7 of the connector 1, as shown in FIG. 11, the bent portions 43b of the second contact elements 43 enter the engagement recesses 21 formed in the card 4 so that the contact points 43a of the second contact elements 43 are brought into contact with the contact points 42a of the first contact elements 42.

Figure 12:
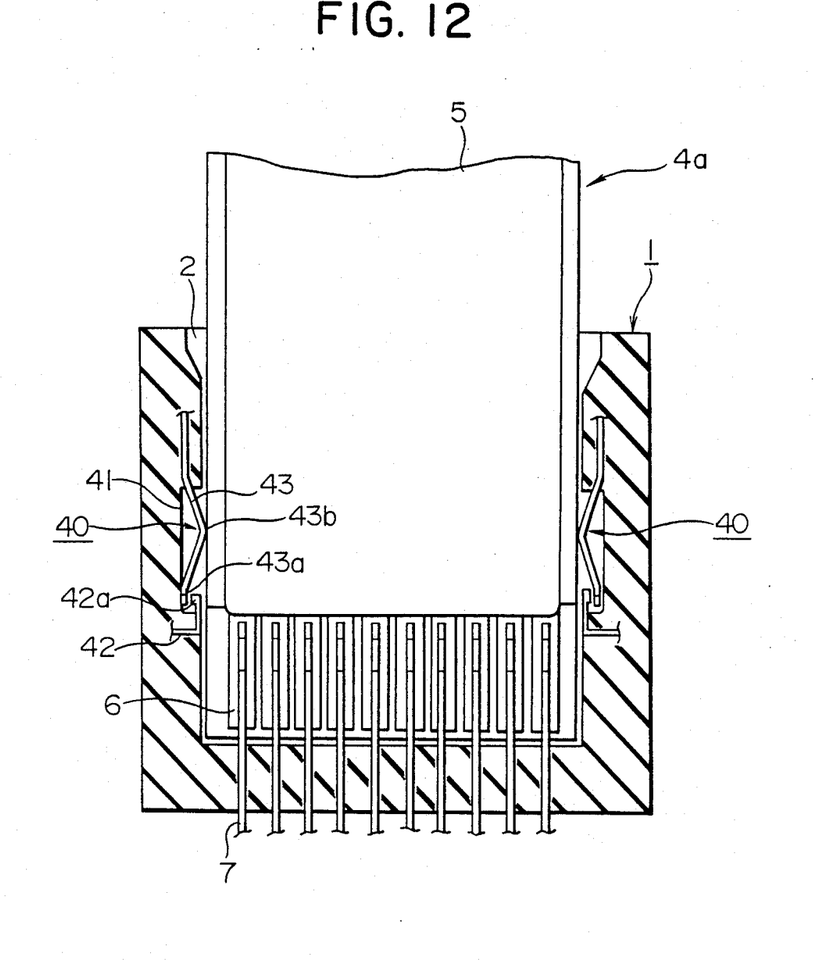
FIG. 12 is a sectional plan view of the connector shown in Fig. 9, illustrating a state in which a different type of card is inserted into the connector.

If as shown in FIG. 12, an IC card 4a which is not the IC card 4 or which is of a type different from that of the IC card 4 is inserted into the connector 1, the second contact elements 43 are depressed by the IC card 4a and are thereby moved toward the recesses 41 so that the contact points 43a of the second contact elements 43 are disconnected from the contact points 42 of the first contact element 42.

If, in this case, the contact means 40 is used to control the operation of the starting or not of the external device (card reader), when a card different from the IC card 4 is inserted, the operation of the card reader can not be started since the contact means 40 are thereby opened. It is therefore possible to determine at the time of insertion whether or not the card inserted is of the authorized type.

Figure 13:
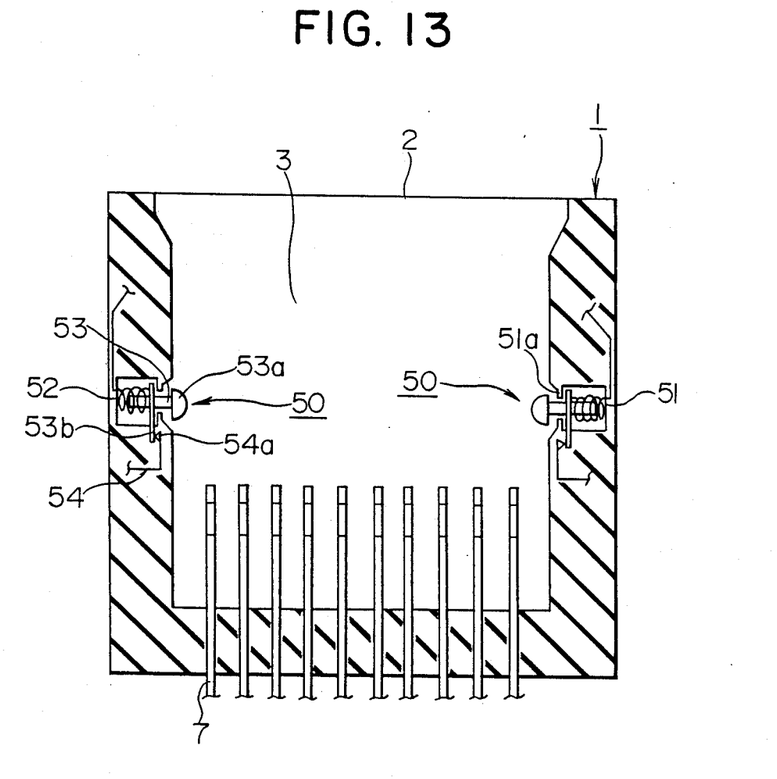
FIG. 13 is a sectional plan view of another example of the connector in accordance with the second embodiment.

The contact means 40 provided in the connector 1 is not limited to the above embodiment, and a means such as that shown in FIG. 13 can be used instead. In each contact means 50 shown in FIG. 13, recess 51 which has stop portions 51a provided on opposite sides of the recess is formed in a side wall of the card receiving portion 3 of the connector 1. A contact pin 53 is capable of projecting from or retreating into the recesses 51 while being urged by spring 52. Spring 52 and pin 53 are electrically connected to, for example, a control section (not shown) of the external device. Each contact pin 53 has a hemispheric engagement head 53a and a collar 53b which is normally in contact with a contact point 54a of a contact element 54. Head 53a also prevents the contact pins from coming out of the recesses. One end of the contact element 54 is connected to the control section of the external device. These members are made of electrically conductive materials.

Figure 14:
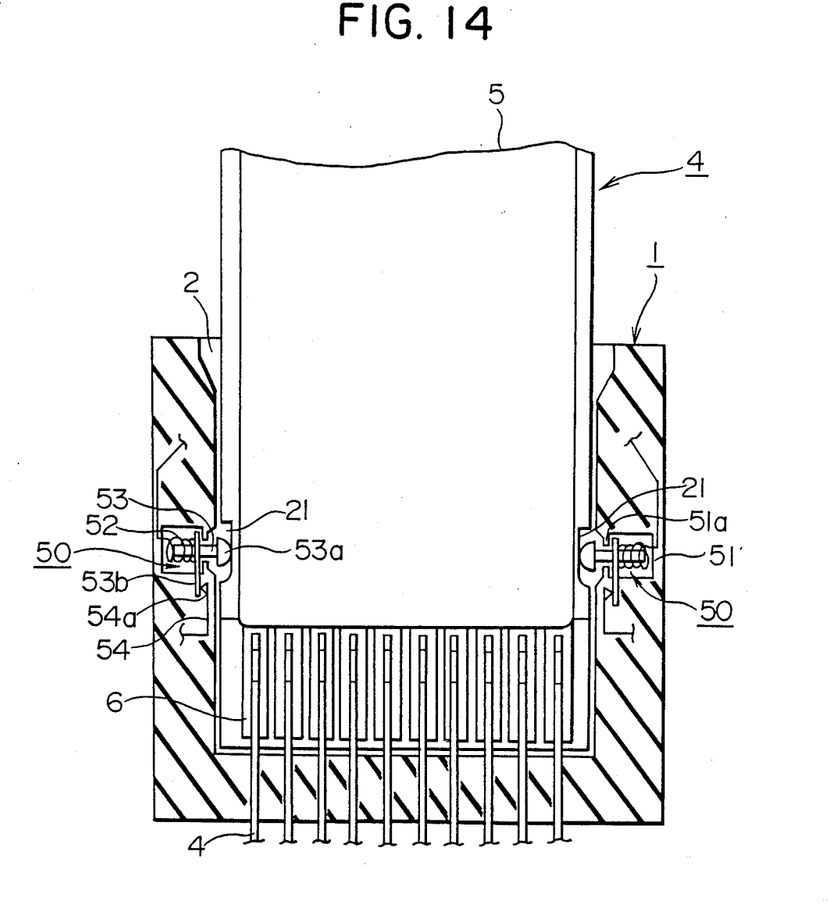
FIG. 14 is a sectional plan view of the IC card shown in FIG. 10 and of the connector shown in FIG. 13, illustrating a state in which the former is inserted into the latter.

If, as shown in FIG. 14, the authorized IC card 4 is inserted into the connector 1, the electrode terminals 6 of the card 4 reach the position at which they contact the electrode-contacting pieces 7 of the connector 1. At this point, the engagement heads 53a of the contact pins 53 enter the engagement recesses 21 of the card 4 so that contact points of the collars 53b of the contact pins 53 and contact points 54a of the contact element 54 are brought into contact with each other.

Figure 15:
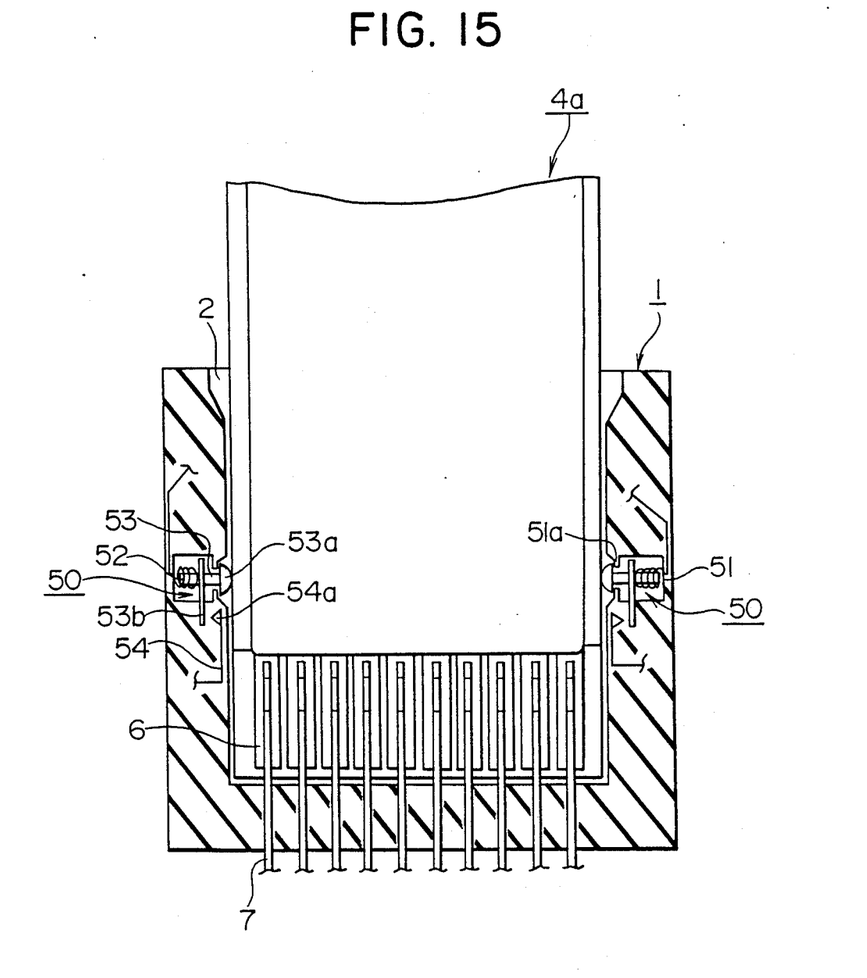
FIG. 15 is a sectional plan view of the connector shown in Fig. 13, illustrating a state in which a different type of card is inserted into the connector.

If as shown in FIG. 15, an IC card 4a which is not the IC card 4 or which is of a type different from that of the IC card 4 is inserted into the connector 1, the contact pins 53 are depressed by the IC card 4a and are thereby moved toward the recesses 51 so that the contact points of the 53b of the contact pins 53 are disconnected from the contact points 54a of the contact element 54.

In this embodiment, the operation of the external device can not be started when the contact means 50 are in the open position, but it is possible to otherwise construct the contact means 50 in such a manner that the external device can not be started when the contact means 50 are in the open state.

The contact means 50 may, of course, have the function of retaining the IC card 4 in the card receiving portion 3 at a predetermined position by engaging with the engagement recesses 21 formed on the IC card 4 in a manner similar to that in the case of the above-described retaining means 22 or 32.

The engagement recesses formed in the IC card and the contact means formed on the connector in accordance with this embodiment are not limited to those described above, and the position, shape, outside dimensions and number of these means can also be selected as desired.

What is claimed is:

1. A connecting mechanism for connecting (i) an IC card package for containing an integrated circuit and including a plurality of electrode terminals for connecting the integrated circuit to an external device and (ii) an electrical connector connected to an external device and including a plurality of contacts for contacting said electrode terminals comprising:

an IC card package including at least one engagement recess;

an electrical connector connected to an external device, said connector including a card receiving portion having opposing side walls for receiving an inserted IC card package, a plurality of contacts for contacting said plurality of electrode terminals when said IC card package is inserted into said card receiving portion to a predetermined position, and at least one resilient retaining means for releasably engaging a said engagement recess to retain a said IC card package when said IC card package is inserted into said connector to said predetermined position, said retaining means comprising:

a retainer recess formed in at least one of said side walls communicating through an opening with said card receiving portion and including stop portions formed at said opening;

a retaining pin having a body at least partially disposed in said retainer recess, an engagement head on said body protruding into said card receiving portion for engaging said engagement recess, and a collar mounted on said body and disposed in said retainer recess for preventing said retaining pin from coming out of said recess by engaging said stop portion; and a helical spring disposed inside said retainer recess around said body, engaging said collar and said side wall and urging said retaining pin toward said card receiving portion.

2. The connection mechanism of claim 1 wherein, when said IC card package is retained at said predetermined position, the contact between said plurality of electrode terminals and said plurality of contacts of said connector is optimized.

3. The connection mechanism of claim 1 including a pair of engagement recesses formed in said IC card package and a pair of retaining means disposed on said opposed side walls of said card receiving portion, said retaining means facing said engagement recesses when said IC card package is inserted to said predetermined position in said connector.

4. The connection mechanism of claim 1 wherein said engagement head has a hemispheric shape for smoothly engaging a said engagement recess.

5. A connecting mechanism for connecting (i) an IC card package containing an integrated circuit and including a plurality of electrode terminals for connecting the integrated circuit to an external device and (ii) an electrical connector connected to an external device and including a plurality of contacts for contacting said electrode terminals comprising:

an IC card package including at least one engagement recess; and an electrical connector connected to an external device, said connector including a card receiving portion having opposing side walls for receiving an inserted IC card package, a plurality of contacts for contacting said plurality of electrode terminals when said IC card package is inserted into said card receiving portion to a predetermined position, and electrical contact means for releasably engaging said engagement recess to retain a said IC card package in position and for closing electrical contacts to enable operation of said external device when said IC card package is inserted into said connector to said predetermined position.

6. The connection mechanism of claim 5 wherein, when said IC card package is retained at said predetermined position, the contact between said plurality of electrode terminals and said plurality of contacts of said connector is optimized.

7. The connection mechanism of claim 5 including a pair of engagement recesses formed in said IC card package and a pair of contact means disposed on said opposed side walls of said card receiving portion, said contact means facing said engagement recesses when said IC card package is inserted to said predetermined position in said connector.

8. The connection mechanism of claim 7 wherein each of said contact means includes:

a wall recess formed in said side wall;

a first electrically conductive hook-like contact element having opposed ends, one end having a contact point, the other end being mounted inside said wall recess and electrically connected to said external device; and a second electrically conductive resilient contact element having opposed ends and a portion projecting from said wall recess for engaging one of said engagement recesses, one end of said second contact element being mounted inside said wall recess and electrically connected to said external device, the other end of the second contact element having a second contact point for contacting and separating from said contact point of said first contact element in response to the engagement and disengagement, respectively, of said second contact element and one of said engagement recesses.

9. The connection mechanism of claim 8 wherein each of said second contact elements of said contact means has a bent portion which projects from said wall recess for smoothly engaging said engagement recesses.

10. The connection mechanism of claim 7 wherein each of said contact means includes:

a wall recess formed in said side wall communicating through an opening with said card receiving portion and including stop portions formed at said opening;

an electrically conductive hook-like contact element having opposed ends, one end having a contact point, the other end being mounted inside said wall recess and electrically connected to said external device;

a contact pin having a body at least partially disposed in said wall recess, an engagement head on said body protruding into said card receiving portion for engaging one of said engagement recesses, and a contact member for contacting and separating from said contact point of said contact element in response to the engagement and disengagement, respectively, of said contact pin and said engagement recess, said pin also having a collar mounted on said body and disposed in said wall recess for preventing said contact pin from coming out of said recess by engaging said stop portions; and a spring disposed inside said wall recess engaging said collar and said side wall and urging said contact pin toward said card receiving portion, said spring being electrically conductive and electrically connected to said external device.

11. The connection mechanism of claim 10 wherein said engagement head has a hemispherical shape for smoothly engaging a said engagement recess.

12. The connection mechanism of claim 7 wherein each of said contact means includes first contacting means for engaging one of said engagement recesses, second contacting means contacting said first contacting means, and means for accommodating said first and second contacting means in said side wall, said first contacting means contacting and separating from said second contacting means, respectively, in response to its engagement with or disengagement from one of said engagement recesses.

* * * * *